Figures 1, 2:
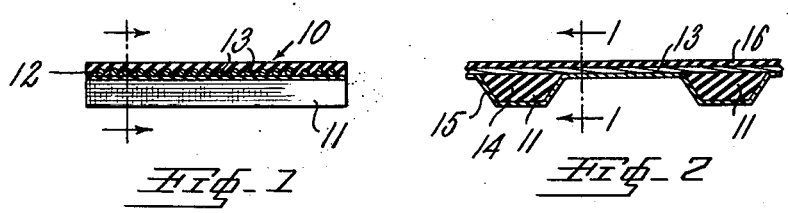

Feb. 19, 1963  W. A. SKURA  3,078,206
METHOD OF FORMING BELT TEETH IN REINFORCED
POSITIVE DRIVE BELTS
Filed Feb. 25, 1959  2 Sheets-Sheet 1

INVENTOR.
WILLIAM A. SKURA
BY Willard R. Sprowls
ATTORNEY

United States Patent Office 3,078,206
Patented Feb. 19, 1963

3,078,206
METHOD OF FORMING BELT TEETH IN REINFORCED POSITIVE DRIVE BELTS
William A. Skura, Philadelphia, Pa., assignor to United States Rubber Company, New York, N.Y., a corporation of New Jersey
Filed Feb. 25, 1959, Ser. No. 795,547
7 Claims. (Cl. 156—140)

This invention relates to an improved method of molding positive drive belts of the type disclosed in United States Patent No. 2,507,852 to Richard Y. Case, which are provided with strain resisting members or load carrying bands, to which are bonded plastic or resilient yieldable rubber like teeth adapted to mesh with the teeth of gear wheels, or grooves of pulleys, hereinafter referred to as gears. Belts of this type may be made with or without protective fabric tooth jackets.

This invention relates particularly to the operations involved in molding the belt teeth and the application of the protective jacket thereto.

Heretofore the rubber bodies of the belt teeth were separately formed and then placed in the tooth mold cavities in a separate operation. Usually the teeth were covered with a fabric jacket, which sometimes failed to conform to the shape of the mold tooth cavities, because insufficient fabric and/or rubber tooth material were supplied to fill the cavities. Defective teeth also resulted from too much fabric, which caused wrinkles in the jacket.

The principal object of this invention is to simplify the method of making positive drive belts of the type specified, and to improve the quality of the belts.

A further object of this invention is to employ an improved procedure for incorporating the tooth jacket into the belt and thereby cause the jacket to accurately conform to the shape of the cavities and produce accurately shaped teeth.

Another object of this invention is to facilitate the accurate formation of the belt teeth and in incorporating the tooth jacket thereto by the utilization of a rubber which flows relatively freely through the load carrying band under a suitable molding pressure and sets to a suitable degree of hardness required for the proper performance of the belt teeth.

The above objects of this invention are realized by arranging the endless load carrying band of the belt and a layer of tooth forming rubber around and adjacent the interior or exterior peripheral surface of a mold having tooth cavities therein, the tooth cavities being empty, in such a manner that the band is interposed between the rubber and the mold cavities. The tooth forming rubber, a specially compounded rubber, becomes relatively fluid under heat and pressure and is forced through the band into the tooth cavities to fill the tooth cavities and to mold the belt teeth and bond them to the band in a single operation.

In the application of a tooth jacket, a layer of stretchable fabric is interposed between the load carrying band and the surface of the mold containing the tooth cavities, the tooth cavities being empty in the sense that there is no rubber in the cavities and the fabric is forced by and ahead of the rubber coming through the band into the tooth cavities and caused to fill the cavities and conform to their shape by the pressure of the flowing rubber.

Figure 3:
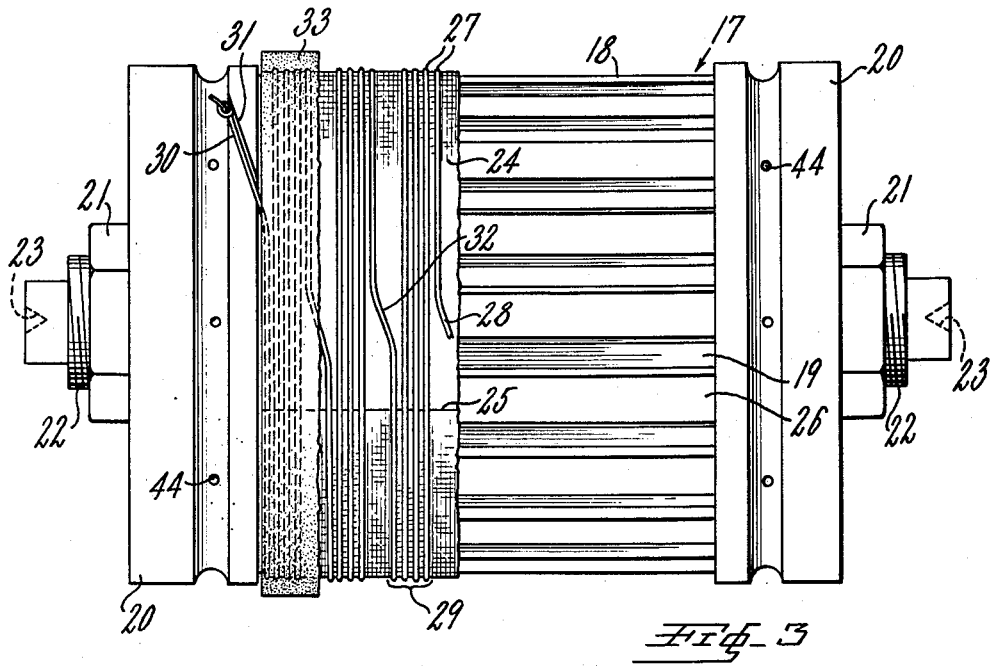
Figure 5:
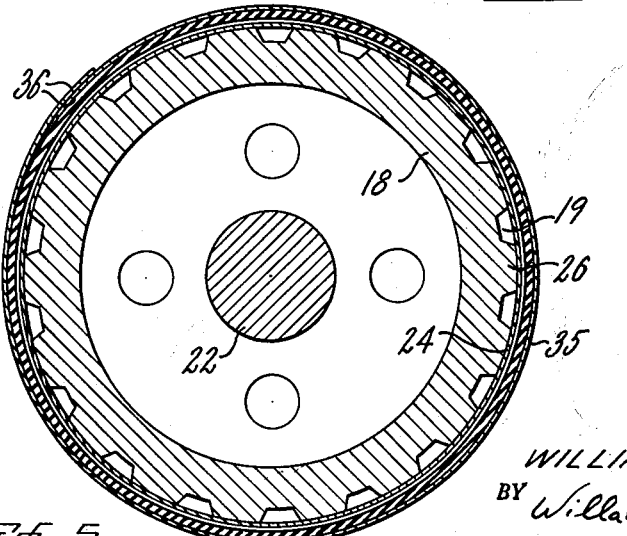
Figure 4:
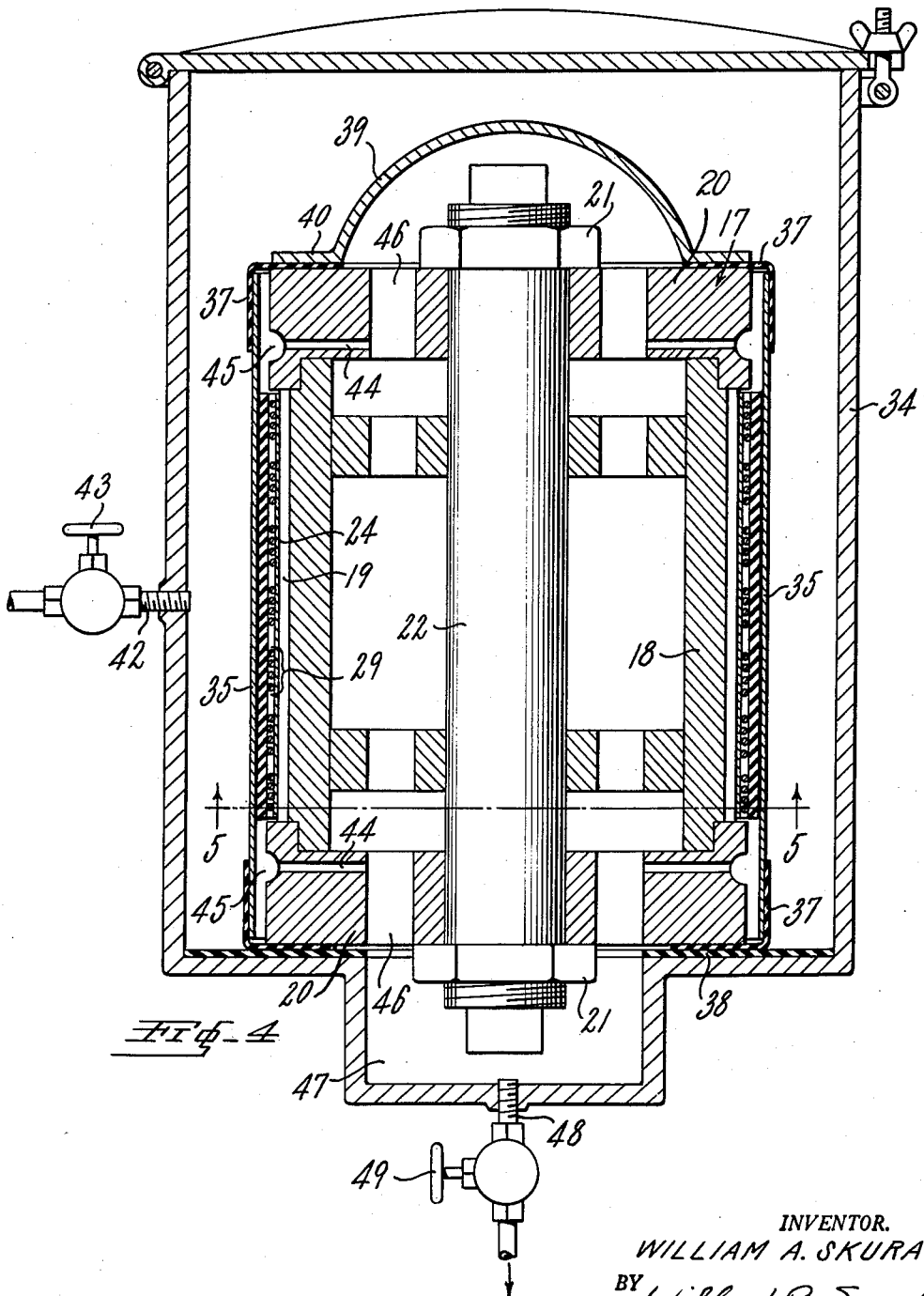

The foregoing objects and advantages of this method will be further described in reference to the accompanying drawings, in which:

FIG. 1 is a transverse cross-sectional view of a positive drive belt made in accordance with this invention;
FIG. 2 is a longitudinal cross-sectional view of the belt shown in FIG. 1 taken on line 2—2 of FIG. 1;
FIG. 3 is an elevational view of the belt mold with the belt parts built up thereon in readiness for the molding operation, but showing parts of the belt broken away to better illustrate the process;
FIG. 4 is a vertical cross-sectional view of the belt mold with the belt parts built up thereon and assembled in a vulcanizer in position for the final vulcanizing operation; and
FIG. 5 is a cross-sectional view of the mold assembly shown in FIG. 4, and taken on line 5—5.

Referring to FIGS. 1 and 2 of the drawings, the belt 10 made in accordance with this process comprises resilient teeth 11, which are bonded to a load carrying band 12 of flexible substantially non-stretchable material having voids therein. As shown herein the band 12 is made of a plurality of helical convolutions of a strand 13, which may be cord or wire. However, the band may be made of suitable loosely woven fabric having its ends suitably joined, or spliced, in the event the belt is to be used for very light loads. The body 14 of the belt teeth is made of rubber, and the teeth 11 are covered with a fabric jacket 15, which is united to the rubber body 14 and the load carrying band 12 between the belt teeth 11. If desired, the belt 10 may be provided with a top cover of rubber 16, which extends through the load carrying band and is united to the rubber tooth bodies 14 and the load carrying band 12, and also to the fabric tooth jacket 15 between the teeth 11.

The elements of the belt 10 are built up upon a mold 17 having a cylindrical body portion 18 provided with axially extending grooves 19 in its outer circumference constituting belt tooth cavities for the formation of the belt teeth 11. The body of the mold is provided with end plates 20, which are clamped to the ends of the body 18 by nuts 21 threaded onto each of the ends of a spindle 22 having centering bores 23.

Prior to building the elements of the belt 10 on the mold 17, the mold is placed in a conventional winding machine and centered between the winding head and the tail stock by the entrance of the centering pins of the machine into the centering bores 23 of the spindle 22. The mold 17 may be manually, or automatically rotated by the winding machine, which will enable the operator to apply the belt elements thereto. A plurality of belts are built up on the mold for each molding operation, and each of the elements of the several belts are applied as a unit.

The method of making the belt shown in FIGS. 1 and 2 is illustrated in FIGS. 3–5 of the drawings. The tooth jacket 15 is made from a piece of stretchable fabric 24, which is wrapped circumferentially around a cylindrical mold body 18 to form the jacket 15 of the individual belts. Preferably the fabric is stretchable in one direction only and the stretch therein extends circumferentially of the mold. The ends of the fabric 24 are united with a lap joint 25, having an overlap preferably between ⅛ and ¼ inch, placed over the ridges 26 between the grooves 19 in the outer circumference of the mold 18. Before being applied, the fabric 24 is impregnated with a rubber cement. This cement remains tacky and adhesively unites lap joint 25. The fabric 24 extends across the grooves 19 and ridges 26, and has sufficient stretch or elasticity for the portion extending over the grooves to be stretched an amount equal to the linear cross-section dimension of the sides and bottoms of the grooves. Preferably the elongation of fabric 24 should be 60% in order to insure that the fabric will completely conform to the shape of the grooves 19, without undue strain or rupture. However, a fabric having a greater amount of elongation may be used, if desired. The fabric 24 preferably is stretchable in one direction only for making straight spur teeth as opposed to herringbone teeth, because one-way stretchable fabric is easier to handle. However two-way stretchable fabric may be used and it is required for making positive drive belts having herringbone teeth.

The load carrying bands 12 for the several belts are formed on the mold by automatically winding over the fabric sleeve 24 a plurality of turns, or convolutions 27 of a strand 28 in groups 29, thereby forming the load carrying band 12 for each belt. Fabric 24 contacts and supports strand 28. Load carrying band 12 may be made from strands 28 of flexible and substantially non-stretchable material such as prestretched cord, or wire; if desired, this band may be made from other materials that are substantially inextensible but presents voids or spaces through which the rubber may flow. As shown in FIG. 3, the starting end 30 of the strand is secured with a knot on its end in a groove 31 in the left end plate 20 as shown in FIG. 3, and the groups 29 of convolutions for each of the load carrying bands 12 of the belt are automatically wound over the fabric sleeve 24 with a jump portion 32 between each of the groups 29.

The rubber layer 33 may be applied over the convolutions of the strands 28 in the form of a calender sheet, and is of sufficient thickness to provide the extruded rubber body portion 14 of the belt. This thickness can be varied to adequately provide the top covering layer 16 since only a portion of the rubber 33 is extruded through the load carrying band 12. As used herein, the term "extruded rubber" and its related forms, refers to the rubber which is forced or pushed out to fill the cavity of an external mold when such is used or to the rubber which is forced or pushed to fill the cavity of an internal mold, when such is used. In order to permit the passage of the rubber 33 through the load carrying band 12, sufficient voids in the band 12 are provided when the convolutions 27 therein are so wound that the surface area occupied by strands 28 is between 48% and 72% of the total surface area of the band.

Layer 33 may be composed of any suitable plastic, such as vulcanizable rubber, or rubber-like materials, which have the proper flow characteristics which will permit it to be forced between the convolutions 27, and then be cured into a firm solid having a durometer A reading of 75-80. For example the rubber layer may be composed of the following rubber compound:

| Ingredients: | Parts |
| --- | --- |
| Neoprene rubber GRT (solid) | 85.00 |
| Neoprene rubber FB (liquid) | 15.00 |
| Stearic acid | .50 |
| Light magnesium oxide | 7.00 |
| Anti-oxidant | 2.00 |
| Carbon black | 55.00 |
| Zinc oxide | 2.00 |
| Low molecular wgt. polyethylene | 6.00 |
| Mercaptobenzothiazole | .75 |
| Total | 173.25 |

The above compound should have a Mooney plastometer reading with the large rotor of 30-40 at 212° F., after being mixed on a mill or in a Banbury mixer in the usual manner. The neoprene rubber FB (liquid) and the low molecular weight polyethylene impart to the compound the necessary flow characteristics, to cause it to become relatively liquid when heated below the vulcanizing temperature so that it can be forced through the convolutions 29 of the load carrying band. When the vulcanization is completed, the rubber has the required hardness for the belt teeth, a durometer A reading of from 75-80.

Having assembled the belt materials on the mold 17, the assembly is removed from the winding machine and prepared to be placed in the steam vulcanizer 34, in which a portion of the rubber layer 33 is forced into the tooth cavities 19 and the rubber is cured. As shown in FIG. 5, a metal sheet collapsible sleeve 35 is placed around the layer 33 and is held in place by surrounding contracting spring bands 36. Angularly shaped gaskets 37 are placed over the ends of the collapsible sleeve 35 and over the mold end plates 20 at each end of the mold. The assembly is then placed in the vulcanizer 34 in a vertical position so that one of the gaskets 37 is supported on a gasket 38 at the bottom of the vulcanizer. A dome shaped cover 39 is placed on top of the mold. The flange 40 of the dome 39 extends over the top gasket 37 to seal the upper end of the mold.

As will be noted, the mold 17 is hollow and its interior is sealed from its exterior by the gaskets 37 interposed between the top end plate 20 of the mold and the dome 39 and between the bottom end plate 20 and the bottom of the vulcanizer.

The layer of rubber 33 and the stretchable fabric tooth jacket material 24 are caused to conform to the exterior shape of the mold body 18 by subjecting the exterior of the collapsible sleeve 35 to gaseous pressure, and permitting any trapped gases on the interior of the metal sleeve 35 to escape. Pressure is applied to the exterior of the sleeve 35 by admitting steam at 100 lbs./sq. in. pressure to the vulcanizer 34 through a steam connection 42 which is controlled by a valve 43. The sleeve 35 is collapsed, that is, contracted circumferentially, and any trapped gases between the interior of the collapsible sleeve 35 and the exterior cylindrical surface of the mold 17 are permitted to escape through radial passages 44 in the end plates 20. The outer ends of the passages 44 are connected to circumferential grooves 45 in the end plates, which collect any trapped gases from the axially extending grooves 19 in the exterior of the mold, and conveys such gases through the passage 44 to the inner ends thereof which are connected to openings 46 in the end plates, and which communicate with the bottom recess 47. The gases are then passed, or exhausted to the atmosphere through a pipe connection 48 which is controlled by a valve 49.

The steam at 100 lbs. pressure is sufficiently hot to soften the rubber layer 33, and such pressure is sufficiently high to collapse the sleeve 35 and force the relatively fluid rubber through the voids in the helical group of convolutions 29 of the load carrying band 12 and into the axially extending grooves 19 to form the belt teeth 11. The rubber forces the stretchable tooth jacket material 24 ahead of it and causes it to conform to the exterior shape of the tooth forming grooves 19. The rubber 33 softens below its curing temperature, and as there is a sufficient volume of rubber in the layer 33 to form the top cover 16 of the belt, the complete filling of the grooves 19 is effective and accurately shaped belt teeth are produced. After the grooves 19 are completely filled additional heat is supplied to vulcanizer 34 to cure the rubber portion of the belt.

After the belt has been cured, the mold 17 is removed from the vulcanizer 34 by first removing the surrounding gaskets and sleeve, and then removing one of the end plates 20 and finally stripping the molded belt band from the mold. Individual belts may be sliced from the molded belt band by cutting the band circumferentially between the groups of strand convolutions of the load carrying band.

While the preferred form of this invention has been described herein, it is to be understood that still other changes may be made without departing from the spirit of the invention and the scope of the appended claims, and it is intended to cover all such changes in such claims.

Having thus described my invention, what I claim and desire to protect by Letters Patent is:

1. A method of molding positive drive belts having teeth thereon comprising the steps of winding stretchable elastic fabric around the outer circumference of a cylindrical mold having axially extending grooves therein to form belt tooth cavities underneath said fabric, said fabric being so applied that the stretch and elasticity therein extends circumferentially of said mold, helically winding a strand in a plurality of convolutions around the circumference of said mold over said fabric to form the load carrying band for said belt, applying a layer of moldable rubber over said band, heating said layer of rubber to soften it, applying pressure to said rubber to force said softened rubber through the spaces between successive convolutions of said band and filling the belt tooth cavities by forcing said stretchable fabric into contact with the walls of said grooves and filling the space between said stretchable fabric and said band with said rubber.

2. The method of molding positive drive belts having teeth thereon comprising the steps of applying stretchable, elastic fabric to the outer circumference of a cylindrical mold having axially extending grooves therein to form belt tooth cavities underneath said fabric, said fabric being applied so that the stretch and elasticity extends circumferentially of the mold, winding a load carrying band around the outer circumference of said mold, applying a layer of moldable rubber over said band, heating and applying pressure to said rubber to force a portion of said rubber through the spaces between successive convolutions of said band and into said tooth cavities, thereby forcing said fabric into contact with the walls of said grooves and filling the space between said fabric and said load carrying band with said rubber to form teeth on said positive drive belt and heat curing said rubber.

3. The method of making positive drive belts having an endless load carrying band with voids therein and resilient rubber teeth bonded thereto which are provided with a protective jacket, comprising the steps of placing a stretchable elastic layer of a fabric jacket adjacent to and around the peripheral surface of a mold having belt tooth cavities therein, said tooth cavities being empty, placing a load carrying band having voids therein adjacent to said fabric, placing a layer of rubber adjacent to said band, heating said rubber to soften it and make it substantially flowable, applying pressure to said rubber to force a portion of said rubber through the voids of said band against said fabric and into said tooth cavities to fill said tooth cavities, and to force said fabric ahead of said rubber into the tooth cavities to form the belt teeth with a fabric jacket thereon.

4. The method of making positive drive belts having an endless load carrying band member and resilient teeth bonded thereto, comprising the steps of forming a belt carcass having an endless stretchable fabric layer, an endless load carrying band layer having voids therein and a substantially endless tooth forming rubber layer, positioning the belt carcass against the peripheral surface of a mold having tooth cavities therein, said fabric layer being positioned closely adjacent said surface, and said band being interposed between said fabric layer and said rubber layer, softening said rubber layer by the application of heat, and applying pressure to force a portion of said rubber layer through said load carrying band forcing said fabric into said cavities and against the walls thereof and filling the space between said fabric and said load carrying band with said rubber to form teeth on said belts with fabric bonded thereto.

5. The method of making positive drive belts having an endless load carrying band with voids therein, and resilient teeth bonded thereto, said teeth having a protective fabric bonded thereto, comprising the steps of positioning an endless one-way circumferentially stretchable elastic fabric along the peripheral surface of a mold having tooth cavities therein, positioning said band and a layer of tooth forming rubber adjacent said fabric layer and against said peripheral surface, said band being interposed between said rubber layer and said fabric, heating said rubber to soften it, and applying pressure to said rubber to force a portion of said rubber in a relatively liquid state through said band, forcing said fabric into the cavities and against the walls thereof and filling the space between said fabric and said load carrying band with said rubber to form teeth on said belt with fabric bonded thereto.

6. The method of making positive drive belts having an endless load carrying band with voids therein and resilient rubber teeth bonded thereto which are provided with a protective fabric, comprising the steps of placing a one-way circumferentially stretchable elastic layer of fabric adjacent to and around the peripheral surface of a mold having belt tooth cavities therein, said tooth cavities being empty, placing said load carrying band adjacent to said fabric, placing a layer of rubber adjacent to said band, heating said rubber and then applying pressure to said rubber to force a portion of said rubber through the voids of said band against said fabric and into said tooth cavities to fill said tooth cavities and to force said fabric ahead of said rubber into the tooth cavities to form the belt teeth with a fabric bonded thereto.

7. The method of making positive drive belts having an endless load carrying band member and resilient teeth bonded thereto, comprising the steps of forming a belt carcass having an endless one-way circumferentially stretchable elastic fabric layer, an endless load carrying band layer with voids therein and a substantially endless tooth forming rubber layer, positioning the belt carcass against the peripheral surface of a mold having tooth cavities therein, said fabric layer being positioned closely adjacent said surface, and said band being interposed between said fabric layer and said rubber layer, softening said rubber layer, and applying pressure to a portion of said rubber layer to force said rubber through said load carrying band forcing said fabric into said cavities and against the walls thereof and filling the space between said fabric and said load carrying band with said rubber to form teeth on said belts with fabric bonded thereto.

References Cited in the file of this patent

UNITED STATES PATENTS

| | | |
|---|---|---|
| 1,510,449 | Brucker | Sept. 30, 1924 |
| 2,337,985 | Freedlander | Dec. 28, 1943 |
| 2,507,852 | Case | May 16, 1950 |
| 2,620,016 | Adams | Dec. 2, 1952 |
| 2,628,505 | Riel et al. | Feb. 17, 1953 |
| 2,635,065 | Nashley | Apr. 14, 1953 |
| 2,792,872 | Murray | May 21, 1957 |
| 2,802,511 | Waugh | Aug. 13, 1957 |
| 2,831,359 | Carle | Apr. 22, 1958 |
| 2,865,214 | Runton | Dec. 23, 1958 |
| 2,893,466 | Fink | July 7, 1959 |

FOREIGN PATENTS

| | | |
|---|---|---|
| 744,907 | Great Britain | Feb. 15, 1956 |